United States Patent [19]

Hasegawa et al.

[11] Patent Number: 4,467,362

[45] Date of Patent: Aug. 21, 1984

[54] APPARATUS AND METHOD FOR TRANSMITTING ULTRASONIC WAVE

[75] Inventors: Wataru Hasegawa, Sakai; Katsuji Ishikawa, Higashiosaka, both of Japan

[73] Assignee: West Electric Company, Ltd., Osaka, Japan

[21] Appl. No.: 364,634

[22] Filed: Apr. 2, 1982

[30] Foreign Application Priority Data

Apr. 10, 1981 [JP] Japan .................................. 56-54912

[51] Int. Cl.³ ............................................. H04N 9/28
[52] U.S. Cl. ................................................ 358/227
[58] Field of Search ............. 358/227, 112; 354/25 R, 354/195

[56] References Cited

U.S. PATENT DOCUMENTS

| | | | |
|---|---|---|---|
| 4,314,750 | 2/1982 | Orban | 358/227 |
| 4,336,987 | 6/1982 | Shenk | 354/195 |
| 4,347,590 | 8/1982 | Heger | 354/195 |
| 4,362,372 | 12/1982 | Keiser | 354/195 |

Primary Examiner—Michael A. Masinick
Attorney, Agent, or Firm—Cushman, Darby & Cushman

[57] ABSTRACT

An ultrasonic wave transmission apparatus built in an image producing apparatus with an auto-focusing apparatus has features that transmission timings are determined by processing a vertical synchronization signal produced in the video camera and that transmission operations are made within blank times of the vertical synchronization signal thereby eliminating noise troubles in image reproduction made in the video camera.

3 Claims, 3 Drawing Figures

APPARATUS AND METHOD FOR TRANSMITTING ULTRASONIC WAVE

BACKGROUND OF THE INVENTION

1. Field of the Invention

The present invention relates to an apparatus and a method for transmitting ultrasonic waves. More particularly, it relates to an ultrasonic transmitter used for an autofocusing device built in an image producing apparatus.

2. Description of the Prior Arts

Conventional auto-focusing apparatus utilizing ultrasonic waves for distance measurements, in general, comprises a means for transmitting ultrasonic waves for a specified short time period and receiving reflected ultrasonic waves, a processing means for generating a control signal responding to a time for the ultrasonic waves traveling from and to the transmitting/receiving means, and further an auto-focusing means for moving lens responding to the generated control signal from the processing means. When such auto-focusing apparatus is employed for monitoring positions of continuously moving objects, for example, in a video camera, it is required for the auto-focusing apparatus to continuously control lens focusing positions base on continuous distance measurements. The following descriptions will be given to video cameras as one example of image producing apparatus provided with auto-focusing apparatus.

Necessity of generation of a strong ultrasonic sound energy for the ultrasonic wave transmitting, sufficient for a distance to be measured, usually compels us to employ a step-up transformer for generation of a high voltage applied to an ultrasonic wave transducer in the auto-focusing apparaus. But, employment of such step-up transformer is liable to cause undesirable voltage variations of a power source contained in the video camera, since an impedance for a load circuit for the power source decreases at each initial moment of the step-up transformer's step-up operation for generating a high voltage to be applied to the ultrasonic wave transducer, and since this makes energy consumption for the power source intermittently large. The above voltage variations cause problems related with image noises during image reproduction.

Distance measurement operations utilizing ultrasonic waves are completed only after receiving reflected ultrasonic waves following transmission of the waves. That means, in order to enable repeated distance measuring required, for example, for the video camera, it becomes necessary to send out ultrasonic waves at an appropriate repetition time interval during the auto-focusing operation for the video camera. But such repeated transmission of the ultrasonic waves causes the above-mentioned image noise problems.

SUMMARY OF THE INVENTION

The present invention relates to an apparatus and a method for transmitting ultrasonic waves without causing image noises even when the apparatus is built in a video camera.

DESCRIPTION OF THE PREFERRED EMBODIMENTS

The disclosed ultrasonic transmission apparatus in accordance with the present invention has a distinctive feature that when built into a video camera provided with an auto-focusing apparatus auto-focusing operations are made without causing noise problems in the video camera. This feature can be obtained by utilizing a vertical synchronization signal in the video camera for determining timings and repetition interval of the ultrasonic transmission operations.

A repetition rate of a vertical synchronization signal is a rate at which images on the video screen is repeatedly produced. It is the usual case in Japan and United States TV signal standards that a repetition rate of about 1/60 sec is employed for a vertical synchronization signal for video cameras. In such standards, a blanking pulse time of about 1.2 m sec is provided as a short intermission time between one image production and the the next image production.

The ultrasonic wave transmission time is usually enough with about 1 m sec. Therefore, it becomes possible to transmit ultrasonic waves during blanking times without noise troubles due to voltage variations associated with the circuits.

Figure 1:
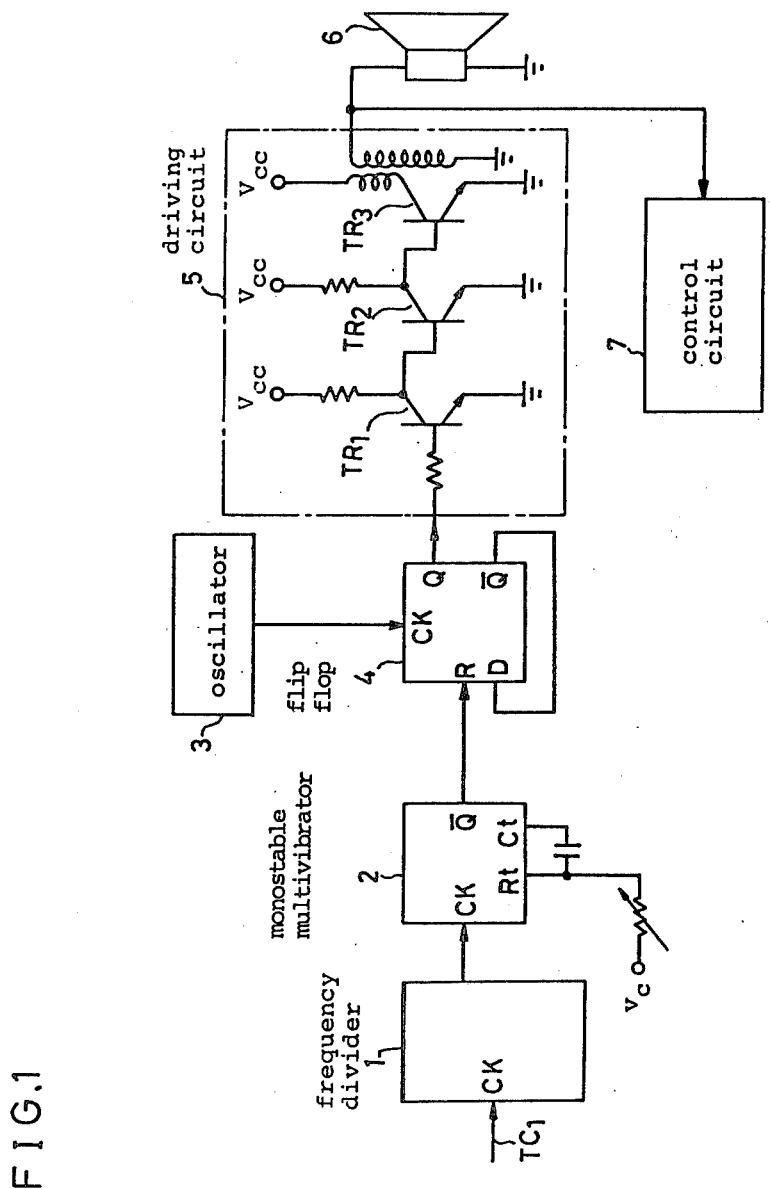
FIG. 1 is a circuit diagram of an ultrasonic transmission apparatus embodying the present invention.
Figure 2:
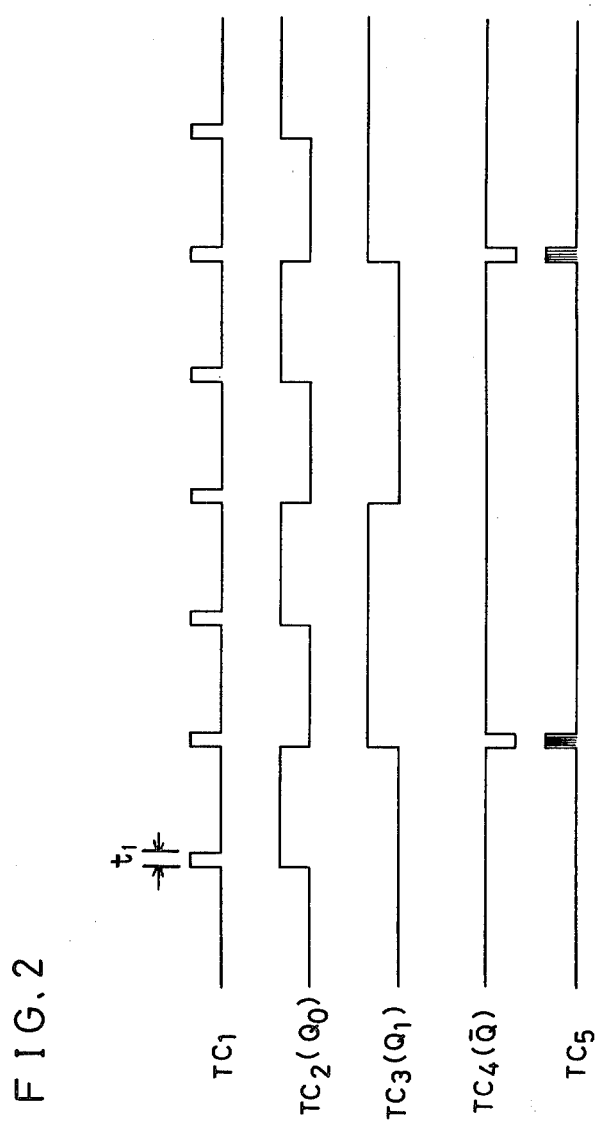
FIG. 2 is a signal wave diagram showing signal wave forms at several places in the circuit diagram of FIG. 1.

FIG. 1 is a circuit diagram of an ultrasonic transmission apparatus embodying the present invention. FIG. 2 is a signal wave diagram showing signal wave forms at several places in the circuit diagram of FIG. 1. The ultrasonic transmission apparatus shown in FIG. 1 comprises a 1st frequency dividing means 1 as a 2nd counter, a 3rd one-shot last or monostable multivibrator 2, an oscillator 3, a flip-flop circuit 4 as gating means, a driving circuit 5, a transducer 6, and a control circuit 7.

The frequency dividing means 1 divides a frequency of a vertical synchronization signal $TC_1$ (in FIG. 2) having a blanking pulse time $t_1$ and applied thereto as a clock signal from a video camera circuit, so that it generates frequency-divided output signals $Q_0$ ($\frac{1}{2}$-divided signal wave form $TC_2$ in FIG. 2), $Q_1$ ($\frac{1}{4}$-divided signal wave form $TC_3$ in FIG. 2), ..., and $Q_n$ ($\frac{1}{2}(n+1)$-divided signal). The frequency-divided output signals are used to determine repetition rates of the ultrasonic wave transmission in a manner to be outlined below.

The one-shot multivibrator 2 issues one pulse output of a predetermined duty time upon receiving each output from the first frequency dividing means 1. For example, in case that a signal $\overline{Q}$ (wave form $TC_4$ in FIG. 2) as a delayed pulse signal is generated by the one-shot multivibrator 2 by detecting leading edge timings of the signal $Q_1$ (wave form $TC_3$), resetting operations of the flip-flop circuit 4 are released by the application of the delayed pulse signal $\overline{Q}$ to its reset terminal R. Thus, the flip flop circuit 4 gates the ultrasonic frequency signal of an oscillation signal coming from the oscillator 3, and generates an ultrasonic wave signal of wave form $TC_5$ in FIG. 2 from an output terminal Q to the driving circuit 5 which amplifies the ultrasonic wave signal by use of transistors $T_{R1}$, $T_{R2}$ and $T_{R3}$. The transducer 6 transforms the electric signal from the driving circuit 5 into an ultrasonic wave, and transforms reflected ultrasonic waves into an electric signal. The control circuit 7 includes circuit means for detecting and processing the retransformed electric signal, and for adjusting focusing positions.

The repetition rates of the ultrasonic wave transmission are determined by the counted output signal from the first frequency-dividing means 1, as point out above. The number of divisions of the frequency-divided output signal therefrom is selected in response to limits of the distance to be measured in the following ways. For example, when the ¼-frequency-divided output signal $Q_1$ is employed, it is possible to measure a distance as far as 11.3 m in 66.7 m sec ($=1/60\times4$), providing that the sound velocity is 340 m/sec. That is, one distance measurement for an object positioned 11.3 m from the transmitter takes 66.7 m sec, which is the time period that the ultrasonic wave travels to the object and back to the transmitter. When the repetition period of the measurement is of the same order as the time period of the round trip of the ultrasonic wave to the object, care should be taken for the receiver not to receive weak reflection waves coming from other objects positioned farther than the right object within the measurable distance limit, since such weaker reflection waves are from a very far thing, hence are received after the next transmission operation started and/or completed, thereby causing fatal erroneous distance measurements. Counter-measures for coping with such troubles are taken by, for example, adjusting transmission energy levels of the ultrasonic waves low and/or selecting receiving energy threshold levels high taking account of the measuring distance. By taking such countermeasures, the reflected ultrasonic waves in the 1st above-mentioned case coming from the 2nd places farther than 11.3 m are not detected. Detectable reflection waves which produce normal distance measurement signals come back from objects positioned within a distance of about 11.3 m from the transmitter. Thus, the maximum measurement limit is set as 11.3 m.

When the ½-frequency divided output signal is employed for the distance measurement, the maximum measurement limit now becomes about 5.7 m, since the distance for the ultrasonic waves to travel round-trip from and to the transmitter is 33.3 m sec.

Figure 3:
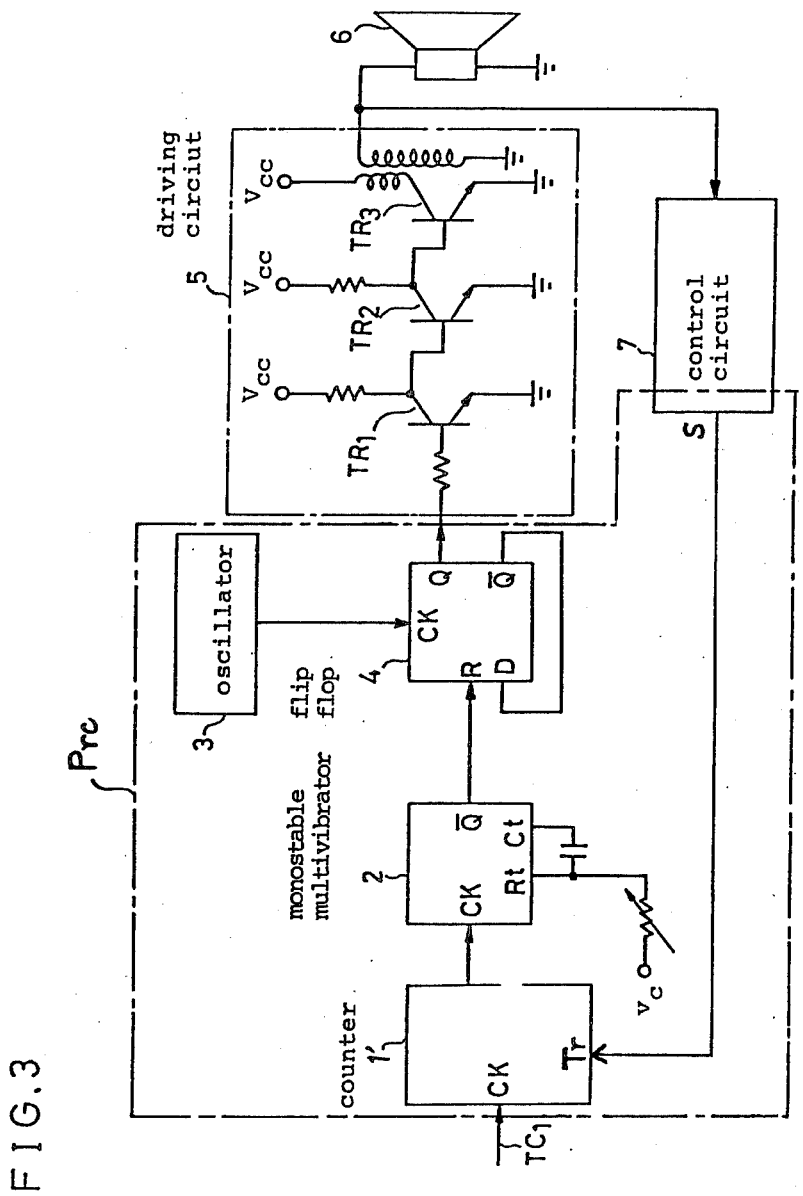
FIG. 3 is a circuit diagram of another ultrasonic transmission apparatus embodying the present invention.

FIG. 3 shows a circuit diagram of a second example, wherein a counter 1' has a control signal input terminal Tr for receiving a control signal or a trigger signal. Upon receipt of a reflected ultrasonic wave from the object, the control circuit 7 issues an output signal to the control signal input terminal Tr, and thereafter the counter 1' starts counting. And after counting a predetermined number of the vertical synchronization pulses the counter 1' issues an output signal to the one-shot multivibrator 2. Other operations are substantially the same as the example of FIG. 1. The part shown enclosed by the chain link block Prc may be constituted preferably by a known microprocessor.

As described so far, the ultrasonic wave transmission apparatus embodying the present invention has the distinctive feature that the ultrasonic wave transmission is made within blank times or return times of the vertical synchronization signal thereby eliminating noise troubles for image reproduction in the video camera. The transmission timings can be simply determined by utilizing the vertical synchronization signal produced in the video camera. In addition, the present invention can provide an ultrasonic wave transmission apparatus capable of generating transmission waves at various repetition periods with ease taking account of measurable distance limits.

What is claimed is:

1. An ultrasonic transmission apparatus for use in image producing apparatus for auto-focusing comprising:
   counter circuit means for counting blanking pulses of a vertical synchronization signal, of said image producing apparatus,
   a pulse generator for generating a pulse signal of a predetermined time width in response to an output signal from said counter circuit means representing a predetermined count of said pulses,
   generation means for generating an electric signal of an ultrasonic wave frequency in response to said pulse signal, and
   transducing means for transforming said electric signal into ultrasonic waves,
   transmission of each ultrasonic wave being made within the time period of a selected one of said blanking pulses of said vertical synchronization signal and the time between transmission of said ultrasonic waves being longer than period between said blanking pulses.

2. An ultrasonic transmission apparatus in accordance with claim 1, wherein
   said counter circuit means is a frequency dividing means for dividing a frequency of said vertical synchronization blanking pulses and
   said pulse generator is a monstable multivibrator.

3. Method of transmitting ultrasonic wave for autofocusing in a television system camera comprising the steps of:
   counting blanking pulse of a vertical synchronization signal for issuing a counter output with an interval longer than the period between said blanking pulses,
   generating an ultrasonic electric signal only within a blanking pulse time period selected by said counter output,
   and
   converting said ultrasonic electric signal into an ultrasonic wave through a transducer.

* * * * *